United States Patent [19]

Silverman

[11] 4,144,949
[45] Mar. 20, 1979

[54] BIT POSITIONING WHILE DRILLING SYSTEM

[76] Inventor: Daniel Silverman, 5969 S. Birmingham St., Tulsa, Okla. 74105

[21] Appl. No.: 792,565

[22] Filed: May 2, 1977

[51] Int. Cl.² .......................... G01V 1/36; E21B 47/02
[52] U.S. Cl. ...................................... 181/106; 175/45; 340/15.5 CP; 340/15.5 TD
[58] Field of Search .............. 181/101, 106, 108, 112; 340/15.5 CP, 15.5 TC, 15.5 TD, 15.5 BH, 15.5 TN, 18 DC; 175/45; 73/151.5; 33/304

[56] References Cited

U.S. PATENT DOCUMENTS

| | | | |
|---|---|---|---|
| 2,062,151 | 11/1936 | Weatherby | 340/15.5 BH |
| 2,101,408 | 12/1937 | Mozzry | 340/15.5 TD |
| 3,278,894 | 10/1966 | Sanders | 340/15.5 TD |
| 3,817,345 | 6/1974 | Bailey | 340/18 DC |
| 3,876,016 | 4/1975 | Stinson | 181/112 |
| 3,940,734 | 2/1976 | Blum | 340/15.5 TD |
| 3,979,140 | 9/1976 | Silverman | 181/106 |
| 4,003,017 | 1/1977 | Bailey | 340/18 DC |
| 4,040,003 | 8/1977 | Brynet et al. | 181/106 |
| 4,058,791 | 11/1977 | Martin et al. | 340/15.5 CP |

FOREIGN PATENT DOCUMENTS 372526 4/1973 U.S.S.R. .......................... 340/15.5 TD

Primary Examiner—Nelson Moskowitz

[57] ABSTRACT

A method and apparatus for determining the precise position of the drill bit on the bottom of a long drill string in a deep borehole in the earth during a drilling operation, comprising placing a plurality of geophones in an array near the surface of the earth above the expected position of the drill bit in the earth, causing at least a weak seismic wave to be initiated at the drill bit in the earth, repeating the source a great many times and determining at the surface of the earth the times of initiation of each of the seismic waves, determining the incremental movement of the drill pipe in the hole, and responsive to the known times of initiation and the known incremental movement of the drill pipe into the hole, stacking each of the repeated geophone signals from each of the geophones for each of the repetitions of the source, whereby each of the stacked signals will be in phase with those that resulted from earlier and later repetitions of the source.

15 Claims, 7 Drawing Figures

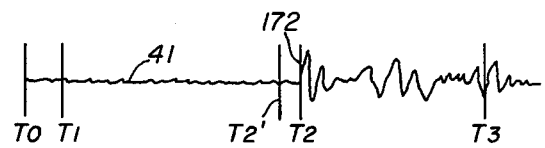
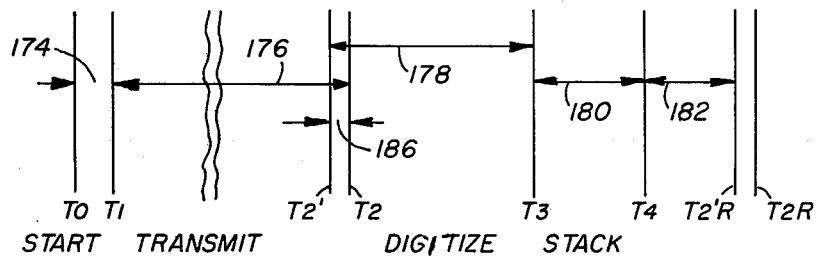
FIG. 2.
FIG. 3.
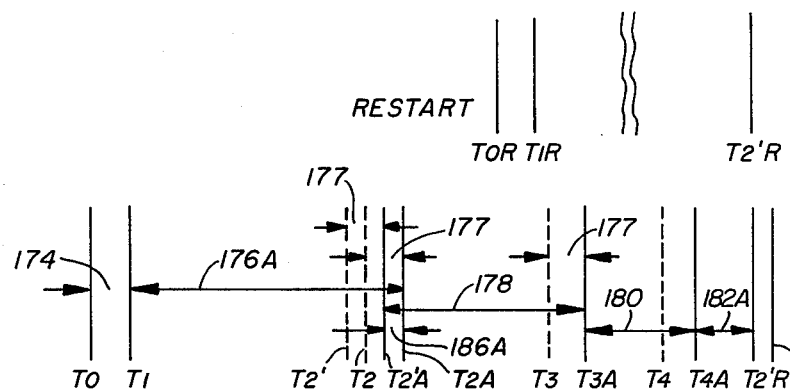
FIG. 4.
FIG. 5.
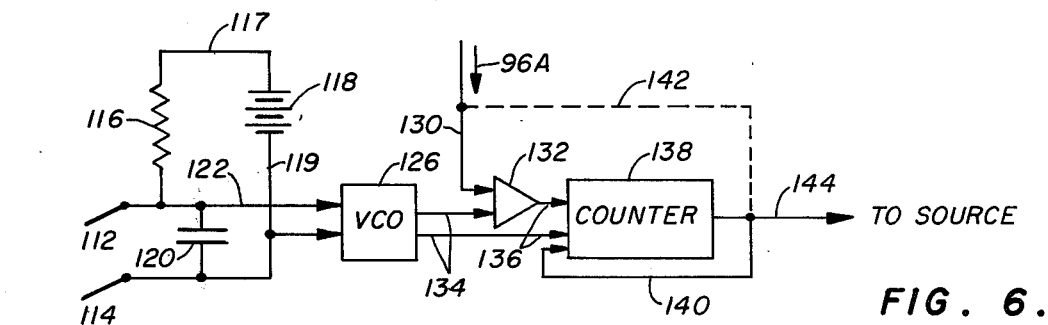
FIG. 6.
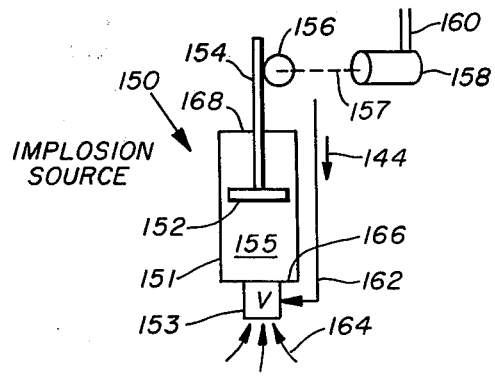
FIG. 7.

BIT POSITIONING WHILE DRILLING SYSTEM

CROSS REFERENCES TO RELATED PATENTS

This application is related to the following patents:
John R. Bailey, U.S. Pat. No. 3,817,345, Continuous Bit Positioning System.
John R. Bailey, U.S. Pat. No. 4,003,017, Continuous Bit Positioning System.
Silverman et al, U.S. Pat. No. 3,993,974, Seismic Method for Determining the Position of the Bit on a Drill Stem in a Deep Bore Hole.
Silverman et al, U.S. Pat. No. 3,979,724, Seismic Method for Determining the Position of the Bottom of a Long Pipe in a Deep Borehole.
Silverman et al, U.S. Pat. No. 3,979,140, Seismic Method for Logging Position of a Deep Borehole in the Earth.
Fort et al, U.S. Pat. No. 4,001,768.
Fort et al, U.S. Pat. No. 3,883,725.
Silverman, U.S. Pat. No. 2,370,818, Well Measurement.
Heilhecker, et al, U.S. Pat. No. 3,807,502.
All of these nine patents are entered into this application by reference.

BACKGROUND OF THE INVENTION

This invention is in the field of elastic wave generation and detection in the earth. More particularly, it is concerned with determining the position in the earth of the drilling bit during a drilling operation in a deep borehole.

In the prior art, various means have been devised for determining the position of the borehole in North-South, and East-West coordinates, at selected depths during a drilling operation. This has been done by using survey instruments specially designed for introduction through the drill pipe, which by their internal mechanisms make a record of the slope of the borehole at each of a plurality of selected depths, and a measure in relation to the magnetic compass, of the azimuth of the slope of the borehole. Knowing the magnitude and direction of slope at each of a plurality of selected known depths, and assuming that the borehole is straight in between the survey points at which measurements are made, the profile of the hole in three dimensions can be plotted.

The disadvantage of this particular system is that it requires a stopping of the drilling process so that the pipe can be broken and the survey instrument inserted on a wire line into the drill pipe. Since the cost of operation of the drill rig runs into many hundreds of dollars a day, time lost from the drilling operation, to make these measurements is extremely expensive.

More recently some effort has been expended on the development of a remote indicating compass and dip or slope measuring means, that continuously indicate at the surface. This is facilitated by an electrical cable positioned inside the drill pipe. However, the precision of these devices is not sufficient for the needs, particularly as the depth of the hole increases.

More recently several patents have been issued which involve a seismic method of measurement involving the use of a seismic source at the bit and detecting the first arrivals of the seismic waves at a plurality of geophones, positioned in an array around the borehole, and determining the position of the source by measurement travel times of the seismic waves to each of the geophones.

These methods hold some promise except that they involve the need for large seismic pulses at the bit to provide a useful signal from the geophones, and it is extremely difficult to provide large seismic pulses without interrupting the drilling process.

SUMMARY OF THE INVENTION

It is a primary object of this invention to provide a simple and inexpensive means for independent determination, at any selected time, a measurement indicative of the position of the bit and the bottom of the borehole during a drilling operation.

It is a further object of this invention to provide a method of determining the position of the bottom of the borehole without interrupting the drilling operation.

It is a still further object of this invention to provide a continuing operation, whereby the position of the bit can be determined at a plurality of selected depths, spaced a selected number of feet apart in depth, whereby a continuous log of the bit position, with time, is obtained.

These and other objects are realized and the limitations of the prior art are overcome in this invention by generating weak seismic waves at the bottom of the borehole, at selected intervals of time.

These weak seismic signals are detected at each of a plurality of geophones near the surface of the earth, positioned in at least a two-dimensional array around the anticipated position of the bit. The geophone signals are digitized and temporarily stored, and then stacked for a great number of repetitions. Because of the weak seismic source and the great seismic noise, the signal to noise ratio (S/N R) will be very poor, and it is anticipated that many hundreds, or thousands, of repetitions and stacking will be required to obtain a useful signal.

A number of ways have been shown by which such weak seismic waves can be generated. Some of these are illustrated in U.S. Pat. Nos. 3,817,345; 3,979,140; 3,979,724; 3,993,974; and 4,003,017. A first way might comprise means to raise the drill pipe a selected small distance and drop it, so that the bit strikes the bottom of the borehole.

A second way involves momentarily stopping the mud flow and building up a dynamic water hammer pressure in the liquid column in the pipe, and then suddenly releasing the mud flow through the bit.

A third general method involves generating a shock wave in the liquid in the drill pipe near the surface, which shock wave will travel down the pipe to the bit, and when expelled from the bit will generate a seismic wave.

A fourth method might involve the water gun system as in U.S. Pat. No. 3,979,140, incooporated into a drill collar, for example, and so on.

All of these methods are adapted to time the initiation of the seismic wave in accordance with a selected time instant at the surface. This is important because of the need for precisely synchronizing successive signals in the stacking process.

The positioning of the receivers at the surface, and their connection to recording and processing means can be in accordance with U.S. Pat. No. 3,817,345, for example.

I have determined that such signals generated, as by dropping the bit, can be detected by analysis of the received signals from the geophones. However, as the depth increases, the amplitudes of the received signals decreases, and it becomes increasingly more difficult to detect these received signals in the presence of the earth noise and drilling noise, also detected by the geophones.

The key to this detection problem lies in the well known method of summing, or stacking, successive received signals, in synchronism with the previously received signals. This method is often used in conventional seismic prospecting, where repetitions of 10 times, or so, are common. Such repetitions provide a signal to noise improvement proportional to the square root of the number of repetitions. Thus improvements in S/N R of 3 to 4 to 1 can be obtained in normal operations. The repetitions must be done with the source substantially stationary, and all stacked signals travelling by identical paths.

The cost in time and money of having great numbers of repetitions must be weighed in terms of the value of the S/N R improvement. This limits the number of repetitions usually carried out in surface seismic prospecting.

However, in this application to bit locations, time is no problem, since the rate of progress of the bit is slow. Thus, tens of hours can be devoted to providing a very precise position indication. If the time of travel of the signal from the bit to the surface is of the order of 2-3 seconds, or more, in one respect the rate of repetition cannot profitably be less than say 5 to 6 seconds, which permits about 700 repetitions per hour. However, since only a short length of trace is required, encompassing a short time, say 100 to 250 milliseconds, repetition rates of 1 second could be used if the signal initiation mechanism will support it.

Depending on the hardness of the rock, the rate of penetration of the bit may be from 1 foot per hour, to possibly 25-50 ft per hour, and if several hours are required to obtain sufficient repetitions to overcome the noise, then the position of the bit has been altered during the stacking process, and the successive seismic waves will not all travel by the same path. This introduces additional travel times in the later signals. If stacking is timed by the time of initiation of the seismic waves, then the received signals of later repetitions will be out of phase with the signals from earlier repetitions. Thus the stacking will not be sharp and the precision of position determination will be poor.

The principal improvement in this method involves, among a number of factors, the measurement of the incremental downward movement of the drill pipe. This is determined from a "starting", or "first" time, such as when a new length of drill pipe is inserted into the drill string.

The stacking is done with a conventional seismic stacker or summer, such as an analog magnetic drum, or a digital disc, or by CCD delay lines, etc. The time of initiation is controlled at the surface, responsive to the summer, and successive repetitions of the seismic signal are started earlier, by a time interval which is a function of the downward movement of the drill pipe. This function can be proportional to the incremental movement, or to some trigonometric function of this movement, taking account of the instantaneous direction of the bottom of the hole determined from earlier measurements. For the most precise measurements, the additional travel times can be calculated for each of the paths to each of the geophones, to ensure synchronous stacking even though the successive paths may be different.

By this system of stacking, the stacking or integration time can be very large, up to several hours, thus providing signal to noise ratio improvements of 30, 40 or 50 to 1, or more.

It will be clear that this large number of repetitions can only be done if they do not interfere with the drilling, which would be the case for a number of the methods previously discussed. As will be described later, the method does not strictly require that the seismic source be initiated by signal from the surface provided only that a signal up the pipe or by conductor can be received at the surface to control the timing of the stacking.

Analysis of the stacked signals would provide a determination of the position of the bottom of the bore hole coincident with the position of the bit at the "starting time". Stacking could be continued even while the pipe was not turning and the bit was off bottom, such as when "washing the hole", and so on, providing only that the source could be initiated.

In other words, since the drilling operation is naturally slow, and since the receiving apparatus can be run, more or less, continuously, very long integration times are possible. Thus very weak seismic signals can be detected, providing only that the stacking can be synchronized with the times of initiation of the signals, from the ever changing position of the source, by a knowledge of the continuing movement of the source.

In view of the high multiplicity of repetitions, and in view of the capability of recovering true signal amplitude of noisy signal information, by digitizing the received signals plus noise to 1 bit, for simplicity of processing, and then using a great many repetitions, I would follow the teachings of Fort et al in U.S. Pat. Nos. 4,001,768 and 3,883,725.

Also, it is possible to multiplex a number of quantized signals by injecting for each of the different signals to be transmitted, a selected value of time delay in the initiation of the source. Such delay will delay the received seismic signals. The signals are all stacked, and the stacked signals are correlated against a standard signal wavelet. Such a correlation will provide correlation peaks for each of the time delayed signals, and the presence or absence of such time delayed signals can be determined, which provides the information that was to be transmitted.

Because of the great number of repetitions possible during the progress of the bit, a selected distance, many signals can be transmitted in sequential or multiplexed form, in the course of determination of the bit position.

BRIEF DESCRIPTION OF THE DRAWINGS

These and other objectives and advantages and a better understanding of th principles and details of the invention will be evident from the following description taken in conjunction with the appended drawings, in which:

FIG. 2 illustrates a typical received trace at one of the geophones.

FIGS. 3, 4 and 5 illustrate successive intervals of time during the generating, transmitting, receiving and stacking periods.

FIG. 6 illustrates one embodiment of a method of telemetering quantized signals from the bit to the surface, by the method of this invention.

FIG. 7 illustrates one type of remotely controlled seismic source for placement at the bit.

DESCRIPTION OF THE PREFERRED EMBODIMENT

Figure 1:
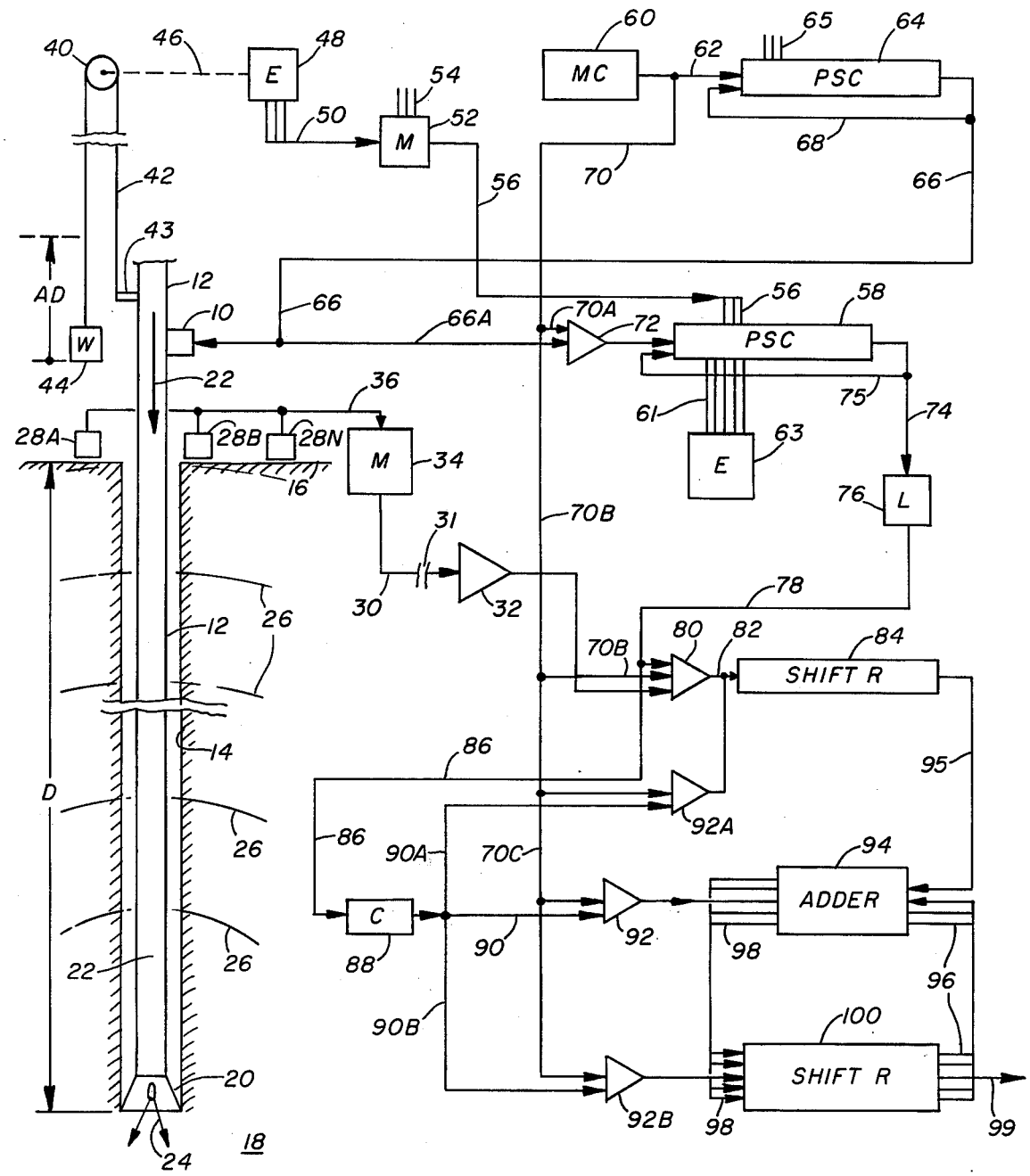
FIG. 1 illustrates one embodiment of the invention using a high multiplicity of repetitions of a weak seismic source, and stacking of the received signals at each of the geophones, including a synchronous stacking of the signals, taking into account the changed position of the bit, and changed paths of travel, as the bit progresses into the earth during the long recording and stacking time interval.

Referring now to the drawings, and in particular to FIG. 1, there is shown one embodiment of this invention.

Basically a weak seismic source is caused to be initiated, in the vicinity of the bit, at the bottom end of the drill pipe in a deep bore hole.

The drill pipe is indicated by numeral 12, in a borehole 14 in the earth 18, from the surface 16 to a selected depth D. Mud flow is shown by arrows 22 down the pipe 12 from a pump and swivel at the surface, not shown, but well known in the art.

One method of initiating the weak seismic source at the bit is illustrated in U.S. Pat. No. 3,979,724 dated Sept. 7, 1976, which has been entered into this application by reference. Reference is made to FIGS. 1 and 2 of U.S. Pat. No. 3,979,724. A chamber indicated in FIG. 1 of this invention by numeral 10 corresponds to numeral 18 of FIG. 1 of U.S. Pat. No. 3,979,724, and 58 of FIG. 2. Chamber 58 is filled with an explosive gas mixture, which is separated by a diaphragm 60 from the mud in chamber 48 and in drill pipe 20.

When the gas is detonated in 58 a shock wave is generated, which passes into the mud, through the diaphragm, and down the drill pipe to the bit. When it issues from the bit, it generates a seismic wave in the earth, indicated by the spherical wave 26, which travels upwardly to the geophones or other detectors 26, each of which is connected by an appropriate cable 28, to a multi-channel amplifier 30, where the received signal generated by the geophones are amplified and sent to a recording means 32.

A sensor 24 is attached to the pipe 24 (or alternatively placed in the mud inside the drill pipe at the surface, or in the mud in the borehole, as fully explained in U.S. Pat. No. 3,979,724) which receives a signal transmitted through the drill pipe from the bit when the shock wave issues from the bit. The time of response of sensor 24 provides means for determining the instant of initiation of the seismic wave in the earth. The waves 40 are detected at the geophones, and thus the travel times of the seismic waves to each of the geophones can be determined. Thus, from the known geometry of the geophones and the well head, the position of the source can be determined.

This is a very brief resume of the process, which is fully described in the referenced patents, which are entered into the application by reference.

Referring now to FIG. 1, there are several important differences between the system of this invention and that of U.S. Pat. No. 3,979,724, for example. These lie in the addition of a means for determining the incremental advance or movement of the drill pipe into the borehole, as the drilling progresses. This is indicated schematically by a cable 42 which is attached 43 to the swivel which supports the kelley rod and the drill stem 12.

The cable goes over a pulley 40 which is attached to the derrick (not shown) and thus is fixed in space. A heavy weight W 44 is attached to the free end of the cable. Thus the cable 42 will be in tension and, as the drill pipe 12 moves down a distance $\Delta D$, the weight 44 will rise a precisely equal distance $\Delta D$, and the shaft 46 that supports the pulley 40 will rotate a corresponding angle $\Delta \theta$, corresponding to the radius of the pulley.

The shaft 46 rotates a digital encoder 48 which puts out voltage pulses corresponding to each unit angle of rotation, or the total angle. Thus the distance $\Delta D$ has a corresponding angle $\Delta \theta$, which produces a binary number $\Delta N$. For a distance $K\Delta D$ there will be a binary number $K\Delta N$ put out on lead 50.

A master clock, or oscillator 60 drives a preset counter 64. The counter is preset to a selected number. Each time the count reaches that number, the counter sends out a pulse on lead 66 and through; lead 68 resets the counter. Thus at a selected interval of time depending on the frequency of the clock 60, and the preset of the counter 64, a pulse goes by lead 66 to the cource 10 to initiate a shock wave in the drill pipe mud. This travels at a known velocity to the bit. Knowing the length of the drill pipe D, the time of initiation of the seismic pulse or wave can be determined, that is, when the shock wave reaches the bit and flows out 24 into the earth to initiate the wave 26.

This wave travels up to the surface 16 of the earth 18 and is detected by the geophones 28A, 28B . . . 28N, etc., arranged in a predetermined array, which should at least be a two-dimensional array.

These signals can then go to conventional amplifiers, summers, etc. as shown in U.S. Pat. No. 3,979,724. However, since there are to be a great number of repetitions of the source, I prefer to follow the teachings of Fort et al in U.S. Pat. Nos. 4,001,768 and 3,883,725, which are entered into this application by reference.

Basically the teaching of Fort et al in handling noisy seismic signals, is to digitize the signals to 1 bit, and to stack many repetitions. It has been proven that the true amplitude information that is "apparently" lost by the digitization to 1 bit, is not really lost, since the digitization is closed by the noise, in the digitization process. When a large number of repetitions of the signals are summed, the signal increases from a single bit to a multibit digitization, and the true amplitude character of the signal is recovered with a very much improved S/N R.

The signal from the geophones 28 then goes to a plurality of amplifiers like 32 of high constant gain. This is indicated schematically by the multiplexer 34. This can be simply an array terminal of Fort, which outputs on lead 30 a series of 1 bit digital signals, which correspond to the serial multiplexing and digitizing to 1 bit. This series of 1 bit signals, now form a continuous train, of which only a short time portion is desired.

In other words, the seismic wave 26 takes a time to reach the surface, which may be short or long, depending on the depth D and the velocity of seismic waves in the earth. Referring to FIG. 2. the trace 41 represents the analog seismic wave reaching a geophone, and the corresponding analog electrical received signal from the geophone. If $T_0$ represents the time of the signal to 10, and the time of initiation of the shock wave in the drill pipe, the later time $T_1$ will represent the time of arrival of the shock wave at the bit, and the time of initiation of the seismic wave. Then $T_2$ represents the time of arrival of the seismic wave 172 at the surface. Thus, time $T_1$ to $T_2$ represents the travel time from the bit to the geophone of the first arrival signal 172. A short portion of the record, say from $T_2$ to $T_3$, which may vary from 100 to 250 milliseconds (ms), may be all that will be needed to define the first arrival energy.

Thus, the receiving equipment should be turned on at some time earlier than $T_2$, say $T_2'$, and turned off at $T_3$.

The signal on 66, at time $T_0$, represents a short time interval before $T_1$ (the time of arrival of the shock wave at the bit). This time is a variable dependent on the length of drill pipe D, in the hole.

A preset counter 58 has leads 61 to preset a digital number corresponding to the time delay from $T_0$ to $T_2'$. This number is entered from an encoder or other input 63 by manual setting of dials, for example. However this preset number can be set in automatically by determining the length D of the drill pipe, by summation of the movement of cable 42, taking into account each entry of a new length of drill pipe into the drill stem.

The preset counter is started by leads 66A receiving the start pulse from 66 to 10. The counter also receives the clock pulses on lead 70A, through gate 72 to the counter 58. When the count reaches the preset number, the counter 58 puts a pulse on 74 which trips a latch 76, which enables gate 80 through lead 78. The clock 60 then passes pulses from multiplexer 34 through line 30 and amplifier 32. Each clock pulse passes a new digital bit into the shift register 84, up to a selected count (when it is full) and the latch is reset, disabling the shift register.

Assume that the shift register contains 100 cells. Thus 100 digitized values for a trace can be stored, and there can be a separate register for each trace. Or, if there are say 10 geophones or traces, which are multiplexed, then 1000 bits must be stored in 84.

Thus, after the delay in 58, the 1 bit digitizing and storing (at time $T_2'$) is started and goes on until $T_3$, when, say 100 samples per trace and 10 traces have been stored.

Next there is a digital adder 94 which has two inputs 95, 96. One input 95 from the output of shift register 84, which is a 1 bit register, and the other input 96 from a multibit (say up to 16 bits or more) register 100. The two shift registers 84 and 100 are stepped by the clock pulses on lead 70C (or a faster clock) through an enabling counter means 88 that determines when the shift registers have been completely cycled one time. Thus, gates 92, 92A and 92B enable the shift registers, which shift digital bits out via leads 95 and 96 to the adder, where they are added, and the sum then goes by leads 98 back into the input of the multi bit register. At the start, there are no bits in the register 100, and the sum is simply the bits supplied by 84. So the first cycle simply shifts the contents of 84 into 100. On the next repetition of the source and the sampling and digitization of the signals into 84, when the adder is enabled by the counter 88 the bits on 95 and 96 are added and two-bit numbers are now stored in 100. This process is continued until a great enough number of repetitions are made, so that the S/N R of the digitized signals in 100 are adequate for processing, and they are shifted out via leads 99. The signals are then correlated to find travel times, and so on.

Referring back to preset counter 58, which determines time $T_2'$ when digitization starts. There is a second set of inputs 56 from the encoder 48. The number set in here corresponds to the value of $\Delta D$, the incremental penetration, or downward movement of the drill pipe into the borehole, and into the earth. Thus, as the digital word on 50 which represents $\Delta D$ is continuously updated, proportional to the additional time of travel of the seismic waves due to $\Delta D$. Thus the digitized signals of the later arriving seismic signals are digitized at slightly later times, and the arrivals 172 of each repetition will be stacked by the adder in-phase with the earlier and later repetition signals.

Shown in FIG. 1 is a digital multiplier 52 that can be used to multiply the binary number supplied by encoder 48, which represents distance $\Delta D$, to a new number on leads 56 representing travel time $\Delta T$, over the distance $\Delta D$. This would be the case for a vertical hole. However, as the drill hole progresses, the true shape of the hole can be plotted. Thus the true direction of the deepest portion of the hole being drilled, can be determined. Thus the multiplier 52 may also take account of the reduced depth change of the bit because of the direction of the vector representing $\Delta D$, which is not vertical, but is at a known angular direction.

While this precision may not always be necessary, such as when the drilling is slow and the value of $\Delta D$ is small, the capability is in the equipment to take full account of such variables.

Referring now to FIGS. 2, 3, 4, and 5, there is shown in FIG. 2 a trace 41 which starts at a time $T_0$, the time of initiation of the signal to 10 to start the shock wave. The time $T_1$ represents the start of the seismic wave. The time $T_0$ to $T_1$, indicated by numeral 174 represents the time of travel of the shock wave down the drill pipe. The time 174 is a variable dependant upon the length D of the drill pipe in the borehole.

Time $T_1$ to $T_2$ indicated by numeral 176 represents the travel time of the seismic wave from the source to the first arrival signal 172. In order to be sure to catch the true arrival 172, the digitization is started a short time 186 before, at $T_2'$, and continues for a selected time 178 to $T_3$, when a selected number of samples, say 100, more or less, have arrived. Depending on the digitizing interval, time 178 will be, say 100 ms. for 1 ms. digitization interval, 200 ms. for 2 ms. digitization interval, etc.

At time $T_3$ after the digitization is complete, the process of summation or stacking is carried out for the interval 180, to time $T_4$. The digital manipulation after the digitization is complete, can be carried out at a higher bit rate than the digitizing interval. Thus, the summation can be done rapidly in time 180 to $T_4$. Then, after any selected time 182 (such as to allow for additional time delays induced into the seismic signals), after $T_4$, the seismic signal is repeated, and the first recording process is completed.

The time at the end of the waiting interval 182 is labelled $T_2'R$, or a repeat of $T_2'$. In other words, the second repetition can be started earlier at $T_0R$ in FIG. 4 so that the seismic signal from the repetition of the source will arrive shortly after $T_2'R$, at $T_2R$, and the recording and stacking is repeated. There is no need to wait for the entire travel time 176 before the recording and stacking is repeated. The shortest repeat time is shown in FIG. 4.

Shown in FIG. 3 is the situation where D is large, and a new length of drill pipe has been inserted into the drill string. These length may be 30 feet or so in length. This position of the pipe is called the "starting" or "first" position, at a "first" selected time. At this time the weight 44 is at its lowest position and $\Delta D = 0$. The first impulse on 66 to 10 is the first initiation of the source, and this signal will start the recording and stacking process.

The encoder 63 is set to delay the digitizing according to the expected travel time 174 of the shock wave in the pipe, and the travel time 176 of the seismic wave in the earth. The digitization is started at $T_2'$, a selected short time interval 186 ahead of $T_2$. This total time $T_0$ to $T_2'$ applies strictly to the "starting" time and the starting depth of that length of drill pipe. The setting of the encoder remains fixed so long as the same length of drill pipe is at the top of the string and the same series of summations or stackings are under way.

Now, as shown in FIG. 5, as the drilling proceeds, because of $\Delta D$, the same time $T_0$ to $T_1$ is required for the shock wave to reach the bit, but because the bit is deeper, there is added travel time for the seismic waves in the earth, and time $T_2$ for the start of the digitizing moves later by a time interval 177 to $T_2A$. Digitizing starts at $T_2'A$ and continues for the same time interval 178 to $T_3A$ which is delayed behind $T_3$ by the same interval 177.

The interval 177 is of course a variable dependent on $\Delta D$. This additional delay time is in addition to that which is set into counter 58 by encoder 63 (which is constant for all values of $\Delta D$), is provided by encoder 48 controlled by $\Delta D$, and, if desired, modified by a multiplying factor set into the digital multiplier 52, at inputs 54. The modified setting of 48 goes from 52 by leads 56 to a second presetting input to the counter 58.

There are many ways in which the operations included in FIG. 1 can be configured. What has been described in a skeletal system, providing the basic elements of the system, such as the steps of:

(a) initiating at least a weak seismic wave in the earth at the bit and repeating this source at any selected intervals of time;

(b) positioning a plurality of geophones in the earth in known positions, in a selected multi-dimensional array with respect to the expected position of the bit, the geophones adapted to detect and transduce seismic waves in the earth to corresponding electrical received signals, and amplifying and storing these received signals;

(c) determining at the surface of the earth the time of each intiation of the source by transmitting a signal up the pipe, or in the mud in the pipe or other means, when the source is started randomly, or by initiating the source by signal from the surface such as in FIG. 1, or as will be described in connection with FIG. 4;

(d) determining the distance $\Delta D$ that the drill pipe has incrementally advanced into the earth from its first or starting position when $\Delta D = 0$;

(e) knowing the times of initiation and the time delay due to the varying $\Delta D$, synchronously stacking all of the repetitions.

By this method of synchronously stacking, the delay due to $\Delta D$ is removed and the stacked signals will represent the position of the bit, at the "starting" time of the new joint of pipe. Thus, the stacking can be continued for a very long time to get a vastly improved signal to noise ratio.

If the number of repetitions is still not sufficient for a $\Delta D$ up to 30 ft, or the length of the pipe joint added, the stacked digital signals can be recorded on tape, and then later added to the stacked signals corresponding to the length of pipe with an additional joint of pipe, taking proper account of the travel time of the added joint, and so on. Similarly, if the S/N R is good, with the penetration of only a fraction of the length of the pipe joint, a new value can be set into the encoders 63, and 48, will permit a new summation or stacking to be started, corresponding to a new starting time, etc.

FIG. 1 has been illustrated in terms of boxes described variously as geophones 28, amplifiers 32, multiplexer 34, digital encoders 48 and 63, digital multiplier 52, master clock 60, preset counters 64 and 58, enabling or disabling gates, shift registers 84 and 100, adder 92, and so on. All of these items are well known in the art and can be purchased off the shelf. They are fully described in text books and catalogs and published papers. With the brief description given, there is no question that a man skilled in this art could construct the apparatus described in connection with FIG. 1, and also FIGS. 4 and 5. The nine patents listed, which are entered by reference into this application have been entered simply to provide some of the detail which will back up this description of the invention.

This invention has the capability of sending seismic signals from the bit to an array of geophones at the surface. By timing the travel of the seismic signals to the geophones, it is possible to determine the position of the bit in the earth with respect to the array of geophones. While I speak of signals from the "bit", the system could be used with an open ended pipe in the hole, or with a seismic source lowered on a cable, or small pipe, etc.

Having the signal transmission system, it is possible to transmit, or to telemeter, quantized measurements of selected variables measured in the earth at the bit. This can be done by delaying the seismic source by a selected interval of time corresponding to the measured variable. By delaying alternate signals by the selected delay time, and not delaying the intermediate ones, the stacking process will provide the sums of two sets of signals at different arrival times. The time interval between the two signals can be determined by correlating the stacked signals, such as by eye, or mathematically by correlating the stacked signal with itself, to get two spaced correlation peaks. The time spacing between the peaks is a measure of the variable being telemetering. Thus, another title of this invention could be: Method and Apparatus for Telemetering Information from the Drill Bit While Drilling.

Referring now to FIG. 6, there is illustrated one embodiment of a downhole apparatus, which receives a start signal in accordance with the arrow 96A along a signal line 130 from the surface. There are a pair of terminals 112, 114 between which a variable value of resistance R is connected. This variable resistance could, for example, be the resistance of the earth in the vicinity of the electrodes 122, 114, which value of resistance is to be telemetered to the surface, by means of the apparatus of FIG. 1.

A fixed resistance 116 is connected in series with resistance R across a battery 118 by leads 117, 119, forming a potentiometer. The portion of the voltage of 118 appearing across R is a measure of the resistance R. Preferably a capacitor 120 is connected across R. The voltage across R and capacitor 120 is carried by lead 122 to a voltage controlled oscillator 126, the frequency of which varies with the voltage across the capacitor 120.

The output of the voltage controlled oscillator (VCO) 126 goes by leads 134 to the counter 138 through a gate 132 and leads 136. The counter 138 is preset to a fixed number of counts. Thus the length of time taken to make the selected number of counts is a function of the frequency of the VCO, which is a function of resistance R. Each time a start pulse comes down line 130 it starts the counter 138, which stops itself at the selected count, and sends a pulse on lead 144 to the source, to initiate the seismic wave.

By logic means, such as a flip flop, well known in the art, successive starting impulses 96A go direct to 144 as shown by dashed line 142, by-passing the delay mechanism. Intermediate starting impulses are delayed as a function of R. Thus the magnitude of the delay can be determined by comparing the delay of successive signals, after stacking.

In a similar way, a plurality of quantized physical measurements can be multiplexed sequentially in a selected order, always including the measurement with zero delay. In this way, many measurements can be telemetered by the system of FIGS. 1 and 6.

In FIG. 7 is shown one possible type of seismic source that can be used to generate the seismic wave, on a signal transmitted from the surface. This can be electrical or acoustical, say through the drill pipe.

This source is indicated generally by the numeral 150, and comprises an implosion source, comprising a cylinder 151, with a tight fitting piston 152, which can be moved from one end 166 of the cylinder to 168, the other end, by means of a piston rod 154, and gear drive 156 and motor 158. The source of power for the motor can be local, generated by a mud motor, for example, or from the surface over a cable. A valve 153 is attached to end 166, which can be opened rapidly by an electrical signal on lead 162, in accordance with arrow 144. This signal could come from the surface or from the signal delay means of FIG. 6.

With the piston 152 at bottom 166, all water or mud in space 155 is forced out through the valve 153. The valve 159 is then closed. The piston 152 is lifted to the top end 168, creating a partial vacuum inside the cylinder in space 155. When the signal 144 opens the valve 153, the water or mud outside the valve rushes into the space 155 in accordance with arrows 164, creating an implosion, and sending out a rarefaction seismic wave in the earth, to the surface.

Although this invention utilizes much of the prior seismic art, and although seismic operations have been carried out in the past with limited small numbers of repetitions of the source, this has always been done with the source substantially stationary, and the seismic waves travelling by substantially the same path.

I am unaware of any seismic operations in the prior art, where the source has been so weak, and the noise so great that the numbers of repetitions of the source has reached to 5000 to 10,000 or more times, with the source moving to new positions, where the travel paths of the seismic waves are different, during the stacking process.

To synchronously stack these seismic signals requires knowledge of the differential movement and change in position of the source, and a precise knowledge of the starting time of the seismic wave, which is not shown or suggested in the seismic prior art related to methods of determining positions of the bit, while drilling advances the bit in the earth, while the stacking process continues.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. The method for determining the position in the earth of the bit while drilling at the bottom of a deep bore hole, at a first selected instant of time, comprising the steps of;
   (a) in any selected timing, initiating at a source means in the earth at or near the bit, at least a low energy seismic signal, and repeating said initiation at least 100 times, at selectively occurring time intervals;
   (b) positioning a plurality of geophones in the earth in known position, in a selected multi-dimensional array, with respect to the expected position of said bit, said geophones adapted to detect and transduce seismic waves in the earth to corresponding electrical received signals, and amplifying and storing said received signals;
   (c) at the surface of the earth determining the time of each initiation of said source at said bit;
   (d) determining the incremental downward movement of the drill pipe as said bit drills into the earth, starting at the first position of said drill pipe, at said first selected time;
   (e) responsive to the determined times of initiation and the incremental downward movement of the drill pipe, stacking each of said received signals from each of said geophones, for each of at least 100 repetitions of said source;
   whereby each of the received signals for a given geophone will be added in phase with each of the other received signals from said given geophone, both for the preceding and following repetiions of said source.

2. The method as in claim 1 in which said source at said bit is controlled by a signal from the surface of the earth, and said determination of said time of initiation of said source is responsive to said signal from the surface of the earth.

3. The method as in claim 1 in which said source at said bit is not precisely controlled from the surface, and said determination of the time of initiation is responsive to a signal from said bit to the surface.

4. The method as in claim 1 in which the number of repetitions of said source is greater than 500.

5. The method as in claim 1 in which the number of repetitions of said source is greater than 2000.

6. The method as in claim 1 in which the number of repetitions of said source is greater than 10,000.

7. The method as in claim 1 including the additional steps of:
   (a) from the stacked traces and the known times of initiation of the repeated seismic waves, and the known incremental movement of the drill pipe into the hole, determining the travel times of the seismic waves to each of said geophones; and
   (b) determing the precise position of the drill bit in the earth.

8. The method as in claim 1 including the additional steps of:
   (a) in a sequence of repetitions of said low energy seismic signals, delaying a first selected number of said repetitions by a first selected value of time delay interval;
   (b) repeating said weak seismic source a second selected number of said repetitions without time delay;
   (c) after stacking the received signals of said first and second selected number of repetitions, determining the time delay between the signals received from said delayed and said nondelayed repetitions of said source.

9. A bit positioning system for determining the position in three dimensions in the earth of the bit, while drilling at the bottom of a deep bore hole, at a first selected instant of time, comprising:
   (a) source means for generating in the earth at the bit in the bore hole, low energy seismic signal, and means to repeat said source means at selected time intervals, at least 100 times;
   (b) a plurality of seismic wave detectors positioned in the earth near the surface, at least in a two-dimensional array, of selected spacing and location with respect to the expected position of the bit; and means to generate received signals in said detectors responsive to the arrival of said weak seismic signals at said detectors, to provide a multi-trace set of received electrical signals for each of said repetitions of said source;
   (c) means to determine the times of initiation of each repetition of said source;
   (d) means to determine the incremental downward movement of the drill pipe as the bit drills into the earth, starting at the first position of said drill pipe at said first selected time;
   (e) signal stacking means responsive to the determined times of initiation of said at least 100 seismic waves and responsive also to the determined incremental downward movement of said drill pipe;
   whereby each successively summed set of traces will be synchronized with each of the preceding traces, as if the bit were maintained at its first position in the earth, and the summation of said traces will be without timing errors due to the subsequent incremental movement of said bit after said first selected instant of time.

10. The apparatus as in claim 9 including means to delay the initiation of said source by a selected time interval.

11. The apparatus as in claim 9 in which said source for generating said at-least-a-weak seismic wave at the bit comprises;
   means for generating a shock wave in the mud filling the drill pipe, at the mouth of said borehole;
   whereby said shock wave will travel in the mud filling said pipe to the bit, and will emerge from the liquid orifices in said bit, to generate in the earth in the vicinity of said bit, said at-least-a-weak seismic wave.

12. The apparatus as in claim 9 in which said source for generating said at-least-a-weak seismic wave at the bit comprises an implosive source controlled to operate in response to a signal sent from the surface via an electrical conductor.

13. The apparatus as in claim 10 in which said means to delay the initiation of said source by a selected time interval comprises;
   (a) means to convert a selected variable to a selected variable voltage;
   (b) voltage controlled oscillator (VCO) means responsive to said selected variable voltage;
   (c) counter means responsive to the pulse output of said VCO means; and
   (d) means to cause said counter means to count a selected number of pulses from the output of said VCO means.

14. The system as in claim 9 in which said stacking means includes;
   (a) means, on command, to sample and digitize a selected length of said received signal and means to store the digitized signal in a first shift register;
   (b) preset counter means to control the time of said digitization of said received signal;
   (c) means responsive to said initiation time of said source to preset said preset counter means;
   (d) means responsive to said incremental downward movement of said drill pipe to additionally incrementally preset said preset counter means;
   (e) second shift register means;
   (f) adder means to add the contents of said first and second shift register means and to store the sum back into said second shift register means.

15. The system as in claim 14 in which said first shift register means is a 1 bit register means, and said second shift register is a multi-bit register means.

* * * * *